(12) United States Patent
Sinisalo et al.

(10) Patent No.: US 9,660,738 B1
(45) Date of Patent: May 23, 2017

(54) ANTENNA WITH CONFIGURABLE SHAPE/LENGTH

(71) Applicant: Microsoft Technology Licensing, LLC, Redmond, WA (US)

(72) Inventors: Petri Antero Sinisalo, Hyvinkää (FI); Marko Tapani Tuohimaa, Turku (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/935,353

(22) Filed: Nov. 6, 2015

(51) Int. Cl.
| H04M 1/00 | (2006.01) |
| H04B 17/12 | (2015.01) |
| H04B 17/10 | (2015.01) |
| H04B 1/04 | (2006.01) |

(52) U.S. Cl.
CPC .......... H04B 17/12 (2015.01); H04B 1/0458 (2013.01); H04B 17/103 (2015.01)

(58) Field of Classification Search
CPC ........ H01Q 1/243; H01Q 1/242; H01Q 1/245; H04B 1/0053; H04B 17/318
USPC ................. 455/562.1, 575.7, 575.1; 343/702
See application file for complete search history.

(56) References Cited

U.S. PATENT DOCUMENTS

| 6,005,525 | A | 12/1999 | Kivela |
| 6,504,507 | B2 | 1/2003 | Geeraert |
| 6,822,609 | B2 | 11/2004 | Mendolia et al. |
| 7,080,787 | B2 | 7/2006 | Wulff et al. |
| 8,483,751 | B2 | 7/2013 | Black et al. |
| 8,583,193 | B2 | 11/2013 | Meitzler et al. |
| 8,648,752 | B2 | 2/2014 | Ramachandran et al. |
| 8,654,022 | B2 | 2/2014 | Brown et al. |
| 8,909,308 | B2 * | 12/2014 | Ljung .................. H04B 7/0811 343/876 |
| 2008/0299930 | A1 | 12/2008 | Rofougaran et al. |
| 2009/0318094 | A1 | 12/2009 | Pros et al. |
| 2011/0210901 | A1* | 9/2011 | Tikka ..................... H01Q 1/242 343/853 |
| 2013/0335280 | A1 | 12/2013 | Chen et al. |
| 2014/0266962 | A1 | 9/2014 | Dupuy et al. |
| 2015/0044977 | A1 | 2/2015 | Ramasamy et al. |
| 2015/0085944 | A1* | 3/2015 | Mobasher ............ H04B 7/0691 375/267 |
| 2016/0111889 | A1* | 4/2016 | Jeong ...................... H02J 5/005 320/108 |
| 2016/0226130 | A1* | 8/2016 | Allore .................. H05K 5/0247 |

FOREIGN PATENT DOCUMENTS

WO    2011115404 A2    9/2011

OTHER PUBLICATIONS

Cihangir, Aykut, "Antenna designs using matching circuits for 4G communicating devices", In Thesis Doctor of Science, Mar. 2014, 144 pages.

* cited by examiner

Primary Examiner — Sonny Trinh
(74) Attorney, Agent, or Firm — Lee & Hayes, PLLC

(57) ABSTRACT

A mobile communications device antenna assembly comprises at least one matrix antenna. The matrix antenna comprises a plurality of conductor elements connected by a plurality of radio frequency switches. An antenna performance assessment component is configured to determine performance of the matrix antenna. Control circuitry is configured to change a state of one or more of the radio frequency switches on the basis of the determined performance of the matrix antenna.

21 Claims, 8 Drawing Sheets

ANTENNA WITH CONFIGURABLE SHAPE/LENGTH

BACKGROUND

Many different types of mobile phone antennas are known such as inverted F antennas, loop antennas, dipole antennas, monopole antennas, and many other types. As mobile communications devices increasingly operate in a variety of different radio communication bands such as for cellular telecommunications, and complementary wireless services (such as wireless local area networks, WiFi (trade mark) and Bluetooth (trade mark)) there are an increasingly large number of antennas deployed in any one mobile communications device. The mobile communications devices themselves have limited space and are often sized and shaped to be hand held during operation of the antennas.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A mobile communications device antenna assembly comprises at least one matrix antenna. The matrix antenna comprises a plurality of conductor elements connected by a plurality of radio frequency switches. An antenna performance assessment component is configured to determine performance of the matrix antenna. Control circuitry is configured to change a state of one or more of the radio frequency switches on the basis of the determined performance of the matrix antenna.

A method of operation of an antenna assembly comprises determining performance of at least one matrix antenna in a mobile communications device, the matrix antenna having a plurality of conductor elements connected by a plurality of radio frequency switches. The method involves operating control circuitry at the antenna assembly to change a state of one or more of the radio frequency switches on the basis of the determined performance of the matrix antenna.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Examples herein describe a new matrix antenna which is suitable for integration in a metal computing device case. A matrix antenna comprises a plurality of conducting elements connected together by radio frequency (RF) switches. In this way a length and/or shape of at least one radiator of the matrix antenna can be changed by operating one or more of the switches. In some examples, the configuration (that is, the state of the RF switches) of a matrix antenna is set according to a selected frequency band in which the mobile communications device is to operate. In some examples, the configuration of a matrix antenna is dynamically adjusted according to observed reflected power of the matrix antenna.

By changing the configuration of one or more matrix antennas in a mobile communications device it is possible to improve antenna performance despite variations in use case. A use case, is a particular way in which a mobile communications device is held and operated by a user. Thus a use case includes factors such as distance between a user's head and the mobile communications device, size of the user's hand, type of hand grip used to hold the mobile communications device, the distance between the user's body and the mobile communications device, the size and shape of the user's body in relation to the mobile communications device, and other factors.

It has unexpectedly been found that there is huge variation between antenna performance between different individual users of the same antennas in the same metal-cased mobile communications device. This difference is due to differences in the use case; that is, differences in the size of user's hands, differences in the hand grips, differences in the way the mobile communications device is held in relation to the user's body, and others. Results of an empirical study measuring differences in antenna performance between individual users is explained in more detail below with reference to FIG. 2. Use of one or more matrix antennas with configurable shape and/or length is found to facilitate accommodation of different use cases in a way such that antenna performance is improved, as compared with situations where antenna shape and/or length is fixed.

Figure 1:
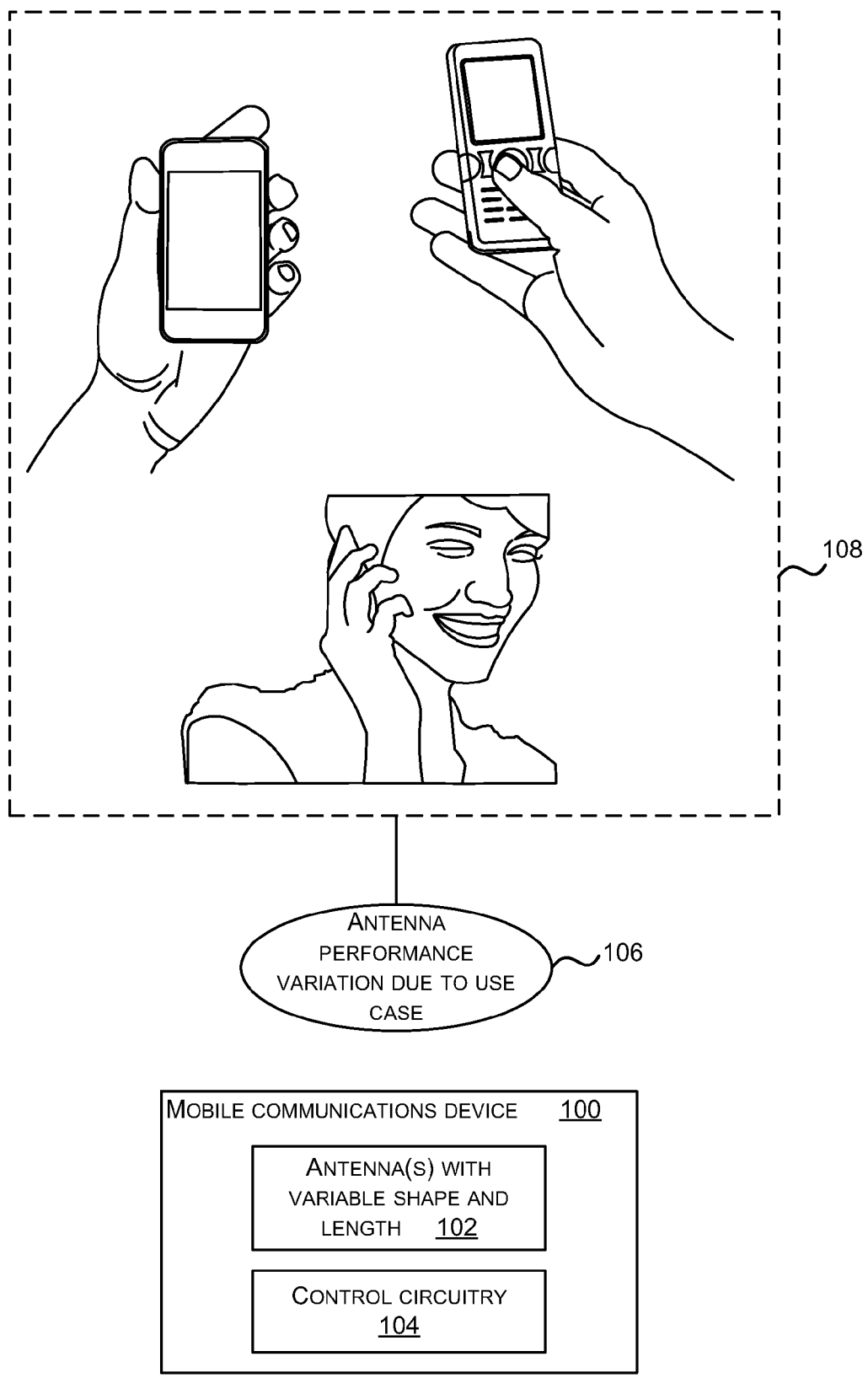
FIG. 1 is a schematic diagram of people holding mobile communications devices in different use cases, and of a mobile communications device having one or more antennas with variable shape and length.

FIG. 1 is a schematic diagram of mobile communications devices 108 in different use cases, and of a mobile communications device 100 having one or more antennas 102 with variable shape and/or length. When a mobile communications device, such as a smart phone, tablet computer, personal digital assistant, wearable computer, or other mobile communications device is held by a user the area of contact between the user and the device varies. The physical proximity between the user and the device also varies. Three examples are illustrated in FIG. 1 for situations where a mobile communications device is hand held. However, these are examples only and are not intended to limit the scope of the embodiments described herein. Other situations exist for cases where the mobile communications device is worn by a user, is hand held in other ways, or rests against or near the user's body in other ways. It has been found that physical proximity and/or contact between the user and the mobile communications device has an effect on performance of antennas in the mobile communications device. In an empirical study described with reference to FIG. 2 below, these effects are found to vary significantly between individual users. Thus as mobile communications devices 108 are used there is an observable effect on antenna performance 106 which varies due to the use case and due to individual differences between users.

A mobile communications device 100 with one or more new antennas 102 enables individual differences between users and/or different use cases to be accommodated in a way which enhances antenna performance. The new antennas have variable shape and/or length. For example, this is achieved using one or more matrix antennas, where an individual matrix antenna comprises a plurality of radiating elements connected by radio frequency switches. The antennas can be integrated in metal parts of a case of the mobile communications device. The antennas are controlled by control circuitry 104 to operate the RF switches and carry out one or more other functions such as feeding the antennas, providing matching circuitry functions, measuring reflected power of the antennas, or other functions. The control circuitry 104 comprises performance assessment components 110 to determine performance of individual ones of the antennas. For example, the control circuitry may comprise one or more components to measure reflected power of an antenna. For example, the components may comprise an antenna tuner. In some examples, where the mobile communications device is a cell phone in a cell of a cellular telecommunications network, the control circuitry comprises functionality to communicate with a cellular telecommunications basestation to obtain information about performance of the antenna(s) as observed by the basestation.

Figure 2:
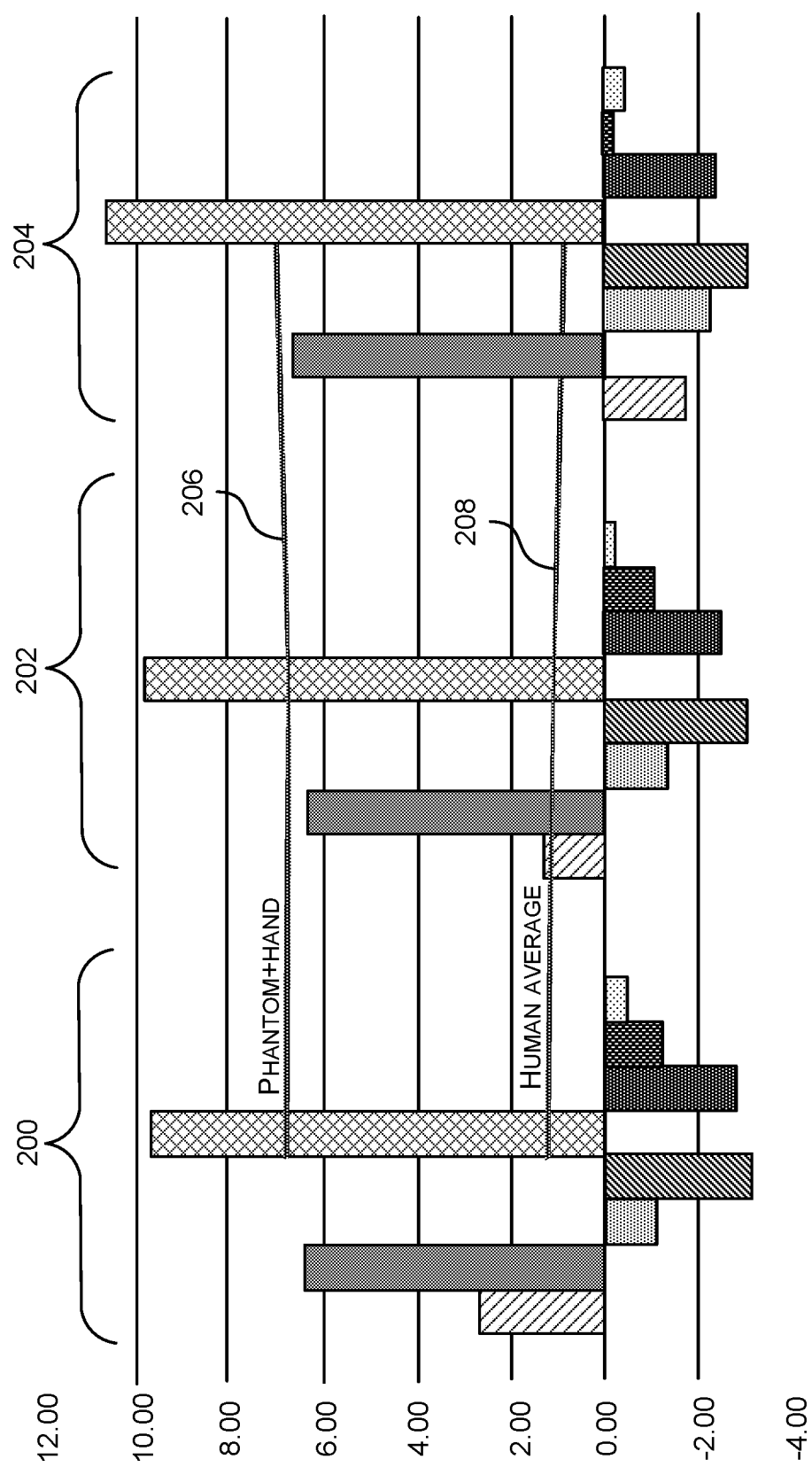
FIG. 2 is a graph of antenna performance for eight different users of a mobile communications device incorporating the antenna, for three different situations.

FIG. 2 is a graph of performance of an antenna in the same cellular mobile telephone used by eight different individuals for each of three different tasks 200, 202, 204. The antenna was integrated in a metal part of the cellular mobile telephone case. These results were obtained empirically by measuring antenna performance using a radio frequency anechoic chamber. Line 208 represents an average of the results for the eight individuals. Line 206 represents the results for a non-human user which took the form of a plastic model of a human hand and arm, filled with water. It can be seen that there is large variation in antenna performance between individuals.

Figure 3:
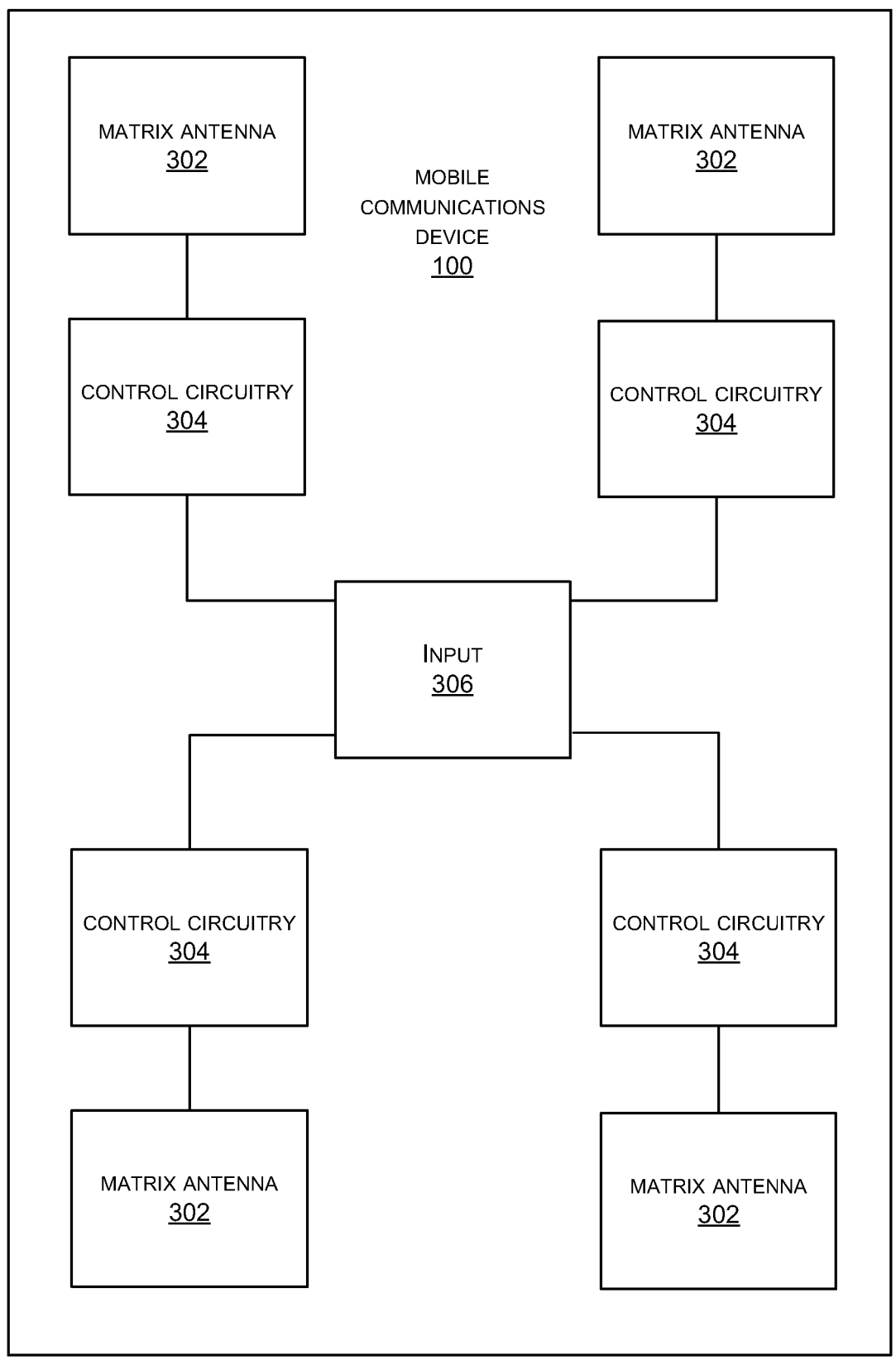
FIG. 3 is a schematic diagram of a plurality of matrix antennas in a mobile communications device.

FIG. 3 is a schematic diagram of a plurality of matrix antennas 302 in a mobile communications device 100 such as the mobile communications device of FIG. 1. In this example, there is one matrix antenna in each corner of a generally rectangular shaped mobile communications device 100. However, it is not essential to use four matrix antennas; other numbers of matrix antennas may be used. Also, the position of the matrix antennas may be varied. Having said that, the situation in which there is a matrix antenna in one or more corners of the device has been found to be useful where the mobile communications device is hand held. This is because typically at least some corners are not in contact with, or spaced from, a user's hand. It is then possible to improve antenna performance by using the matrix antennas in the corners which are spaced from the user's hand. Configuration of RF switches of the matrix antennas which are spaced from the user's hand can facilitate antenna performance. Different ways of selecting which of the plurality of matrix antennas to use are available as described in more detail below.

As illustrated in FIG. 3 an individual matrix antenna 302 is connected to control circuitry 304 and the control circuitry is itself connected to an input 306. In the example of FIG. 3 the control circuitry 304 is shown as being distributed so that the control circuitry is divided into four local parts, one for each of the matrix antennas. A local part of the control circuitry is connected to the associated matrix antenna 302. However, it is also possible to have a single centralized control circuitry which is connected to each of the matrix antennas 302. The input 306 feeds the matrix antennas via the control circuitry 304 and depending on the communications requirements of the mobile communications device can input one or more bands of wireless communications signal, such as cellular communications bands, or complementary wireless service bands such as WLAN (wireless local area network) and Bluetooth (trade mark).

As mentioned above the control circuitry 304 operates RF switches of the matrix antennas. It also comprises performance assessment components to assess performance of the matrix antennas. The control circuitry may also carry out one or more other functions such as feeding the antennas, providing matching circuitry functions, or other functions.

Figure 4:
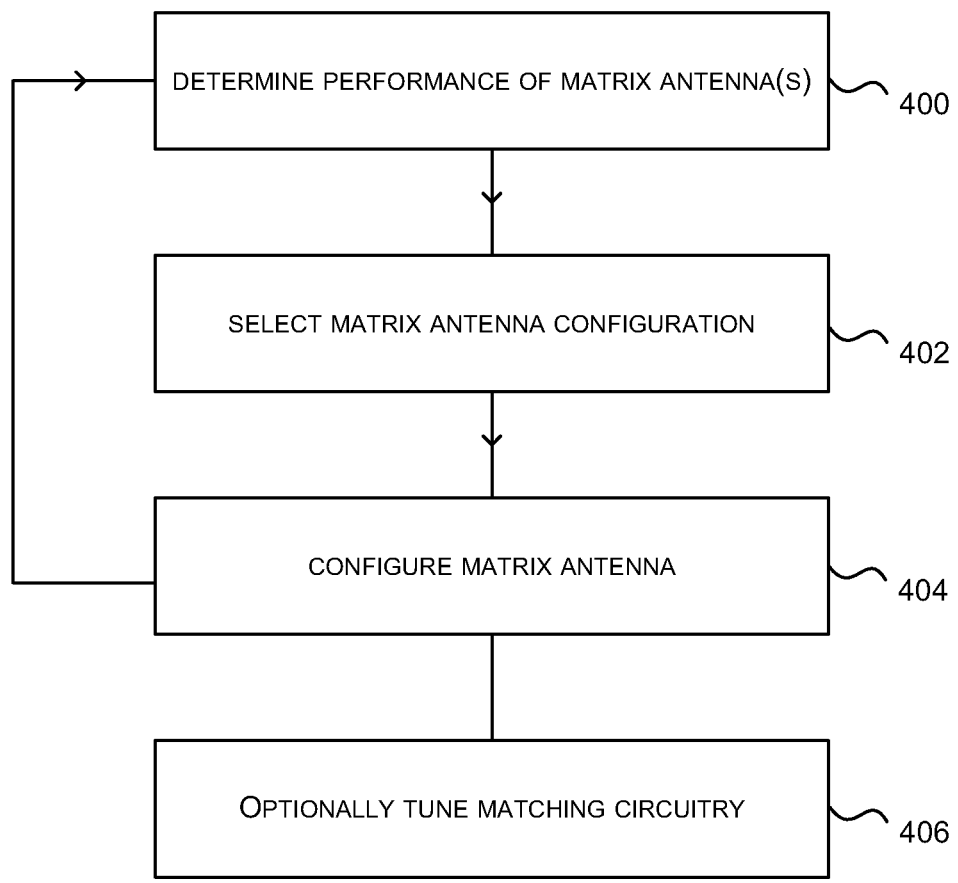
FIG. 4 is a flow diagram of methods of operation of a matrix antenna in a mobile communications device.

FIG. 4 is a flow diagram of methods of operating a matrix antenna in a mobile communications device such as that of FIG. 3. The methods may be carried out by the control circuitry 110, 304. The control circuitry comprises performance assessment components which operate to determine performance of an individual one of the matrix antennas. For example, this may be done by receiving control messages from a basestation of where the mobile communications device is a cell phone in a cell of the basestation. The control messages comprise information about performance of one or more antennas of the mobile communications device as observed by the basestation. In other examples, the mobile communications device is a member of a wireless communications network such as a wireless local area network. In this case the mobile communications device may receive control messages from a wireless access point comprising information about strength of wireless communications signals received from the mobile communications device. The information about signal strength may be used as a measure of performance of the antennas of the mobile communications device.

In some examples, performance is assessed through the use of one or more components in the control circuitry which measure reflected power of individual ones of the antennas. For example, the components may be one or more antenna tuners connected between the radio transmitter (input in FIG. 3) and the matrix antenna to improve power transfer between the input and the antenna by matching the impedance of the radio transmitter to a feedline of the antenna.

The process of FIG. 4 comprises selecting 402 a matrix antenna configuration (states of the RF switches of the matrix antenna) on the basis of the determined antenna performance. For example a library of possible matrix antenna configurations may be stored in the mobile communications device, with associations between individual matrix antenna configurations and observed antenna performance. The control circuitry then performs a look up in the library to select which matrix antenna configuration to use. In other examples, rather than having a library, rules are stored at the mobile communications device to enable it to select which matrix antenna configuration to use. In other examples, the control circuitry is designed to iteratively adjust the matrix antenna configurations in any manner which tends to reduce an error metric, where the error metric is a measure of the antenna performance. The feedback process may comprise a Kalman filter or other similar estimation process.

Once a matrix antenna configuration has been selected 402 the matrix antenna is configured accordingly 404 by using the control circuitry to operate the RF switches. As a result the resonant frequency of the matrix antenna may be changed since the length and/or shape of the matrix antenna changes when the state of the RF switches is changed.

Optionally, matching circuitry is tuned 406 to facilitate matching of the radio input to the combination of the matrix antenna and its feedline. For example, where antenna tuners are present in the control circuitry the tuning of the matching circuitry can be done.

Figure 5:
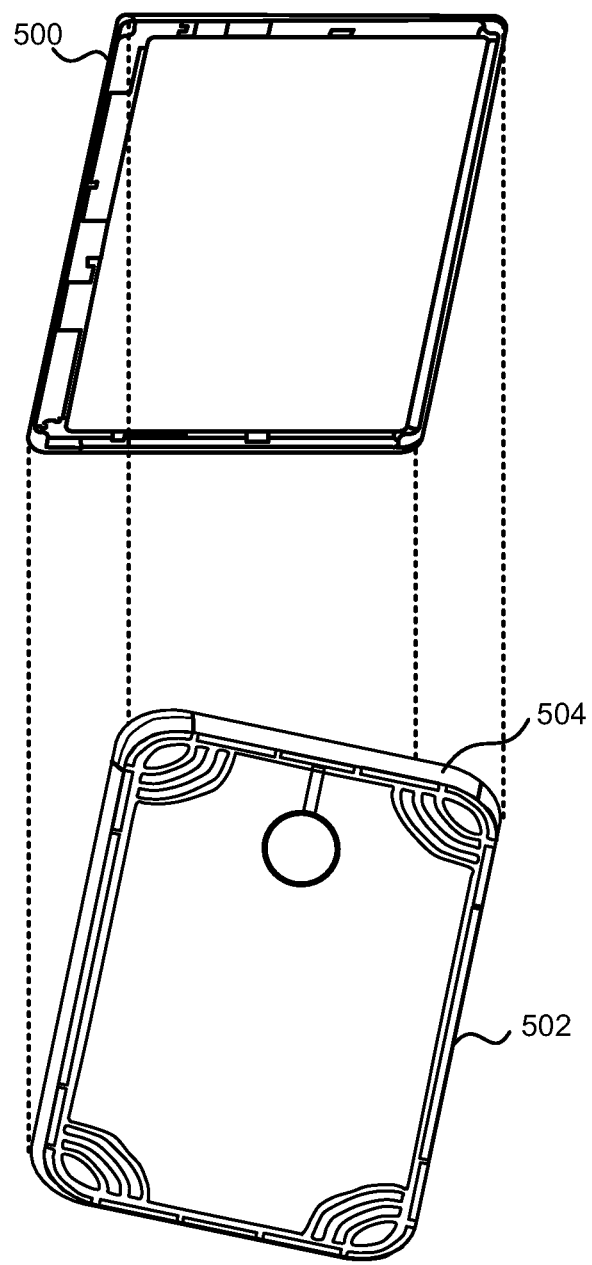
FIG. 5 shows a front and a back part of a mobile communications device case, with a matrix antenna arrangement in the back part.

FIG. 5 shows a front 500 and a back 502 part of a mobile communications device case, with a matrix antenna arrangement in the back part 502. For example, the front part 500 comprises a frame which is sized and shaped to hold a touch screen display and the back part is a rectangular metal sheet with sides 504 that are configured to attach onto the front part 500. The front part 500 and back part 502 are shown separated in FIG. 5 for clarity although in use these parts are connected together as indicated by the dotted lines, so as to contain computing components, sensors, power supply, and other components of the mobile communications device. In the example of FIG. 5 the back part 502 is made of metal and has slots formed in the metal to create the matrix antennas. The slots may be filled with plastic or other non-conducting inserts in use, so as to protect the components inside the case from moisture and dust and also to improve robustness. In this example the matrix antennas are in the back face 502 of the computing device case. However, they may also be in the side faces 504 in addition to the back face 502, or only in the side faces 504. In the example of FIG. 5 the back face 502 of the computing device case is metal. However, it is also possible for part of the back face 502 to be made of non-conducting material such as plastic, although the matrix antenna(s) are formed in a metal part of the back face 502 or sides 504.

Figure 6:
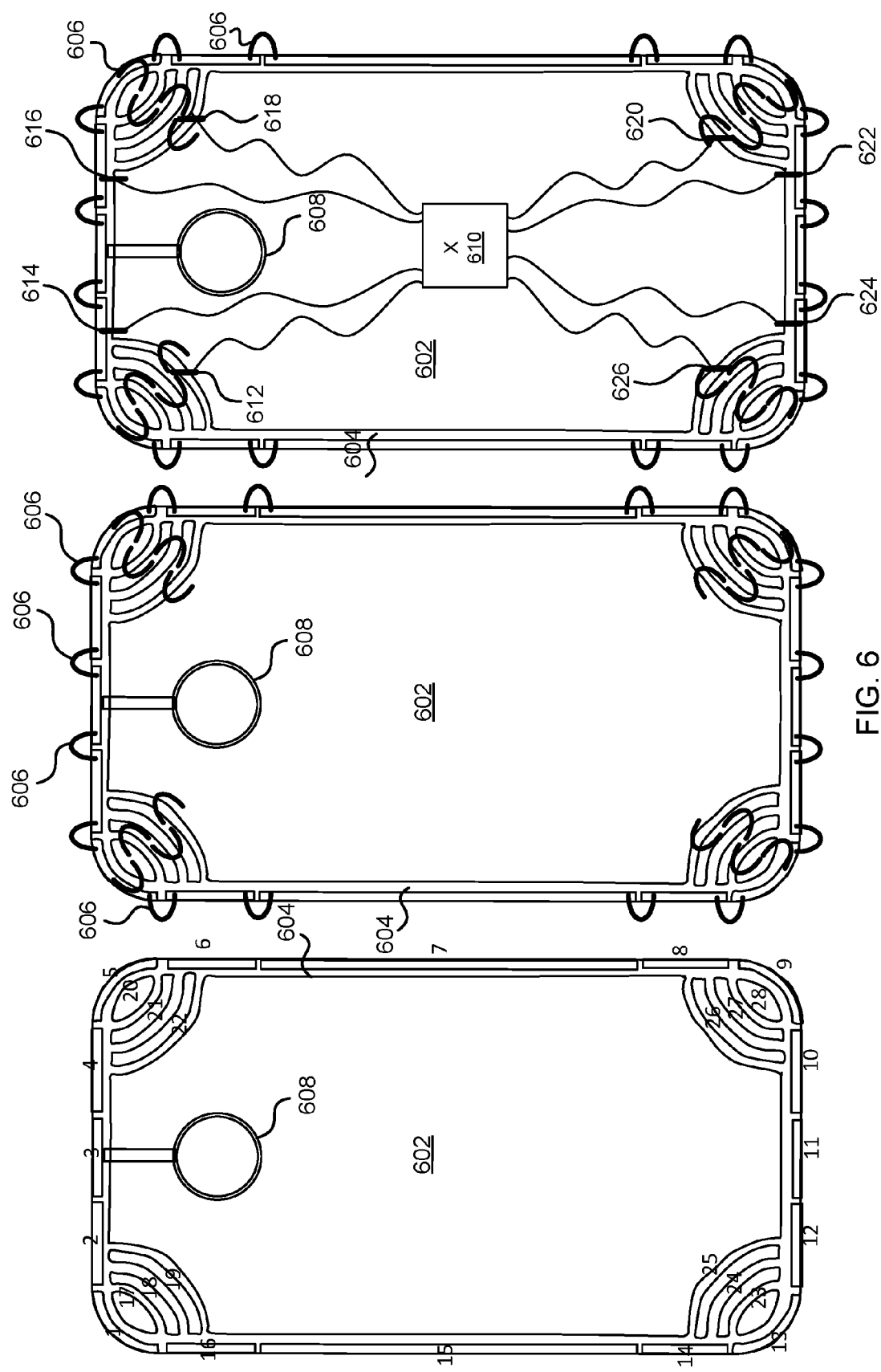
FIG. 6 is a schematic diagram of the back part of the mobile communications device case of FIG. 5 in more detail.

FIG. 6 is a schematic diagram of the back part of the mobile communications device case of FIG. 5 in more detail. The left hand side of FIG. 6 shows the back part 502 with a plurality of slots 604 in the metal of the back part of the case 502. As a result of the slots, conducting elements (also referred to as radiators) are formed in the back part of the case 502 and in this example there are 28 elements numbered 1 through 28. In this example, the slots comprise a slot which extends around the periphery of the back part of the case 502 and which has a plurality of notches (16 notches) that extend into a side face such as side face 504 of the back part of the case 502. As a result 15 conducting elements are formed around the periphery and side faces of the back part of the case 502. The slots also comprise three arched or curved slots at each corner of the back part 502. The curved slots at an individual corner are concave with respect to the associated corner and are generally concentric. Thus at each corner there is a single curved slot which is part of the slot extending around the periphery of the back part, and three additional curved slots.

The central part of FIG. 6 shows the back part 502 with the plurality of slots and in addition, with a plurality of RF switches 606 indicated schematically by arch shaped symbols. Each notch which extends into a side face has an associated switch. Each curved slot has an associated switch. In the example of FIG. 6 there are 32 RF switches.

The part of FIG. 6 on the right hand side shows the back part 502 with the slots, RF switches and also with an input 610 connected to eight feed points 612, 614, 616, 618, 620, 622, 624, 626.

The back part 502 has a circular region 608 reserved for a camera and around which a near field communications NFC antenna coil may be located. However, this circular region and the NFC antenna coil are not essential and may be omitted.

The locations of RF switches 606 are indicated schematically in FIG. 6. The RF switches may be two state RF switches or three state RF switches. Of the total number of RF switches used, these may be all two state switches, or all three state switches, or a mixture of some two state switches and some three state switches. In the case of a two state switch the two possible states the switch may be in are open and pass through. In the open state the switch prevents current from passing from one conducting element to an adjacent conducting element of the matrix antenna. In the pass through state the switch enables current to flow to from one conducting element to an adjacent conducting element of the matrix antenna. In the case of a three state switch the possible states include those of a two state switch and in addition a ground state in which the switch enables current to flow from one conducting element to ground. Good working solutions are possible using two state RF switches. Where three state RF switches are used additional improvements in antenna performance are possible since the number of degrees of freedom of the matrix antenna is increased.

In the example of FIG. 6 a particular design of the matrix antennas is described with one matrix antenna in each corner of a generally rectangular back part of a mobile communications device case. However, it is not essential to use this particular design as other designs may be used. For example, the slots on the lower half of the back face (away from the camera location 608) may be omitted and a good working solution is obtained. In another example, the curved slots are replaced with straight slots. In another example combinations of some curved slots and some straight slots are used. In another example greater or fewer numbers of slots are used.

Figure 7:
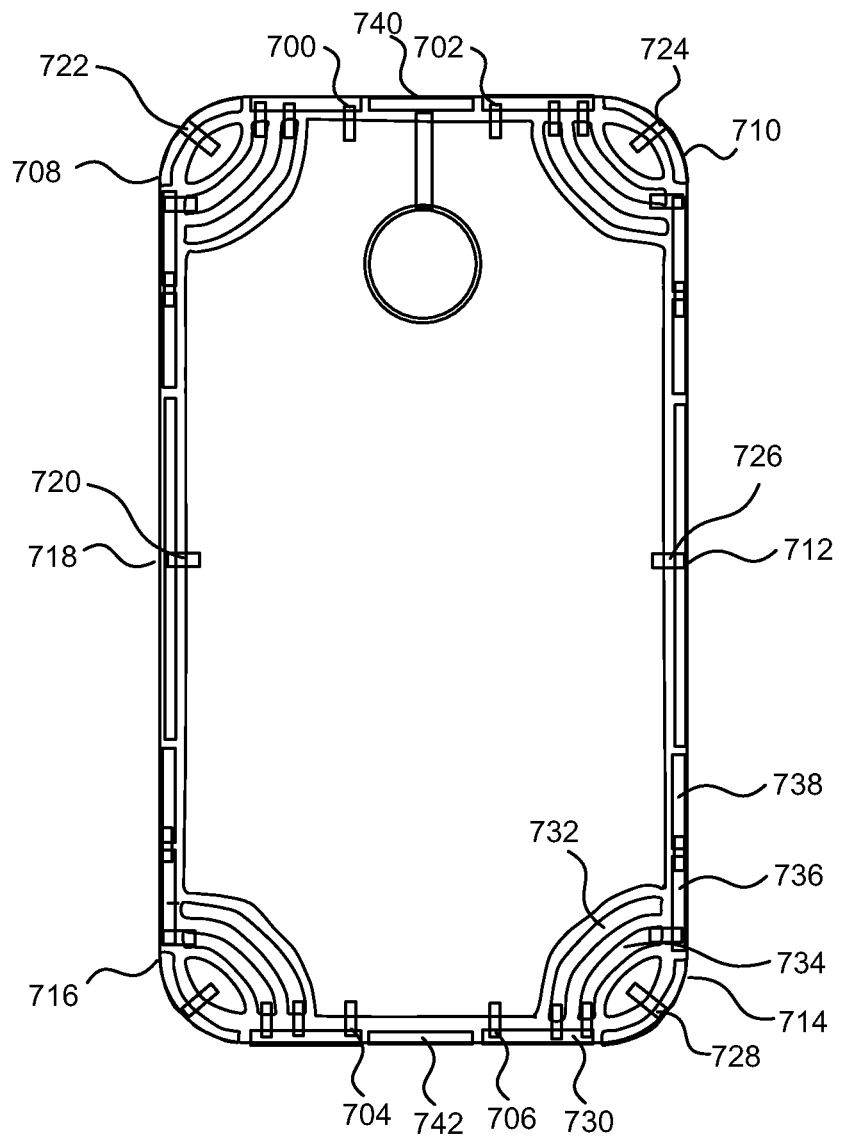
FIG. 7 is a schematic diagram of another example of the back part of the mobile communications device case of FIG. 5.

FIG. 7 is a schematic diagram of another example of the back part of the mobile communications device case of FIG. 5. In this example the same slots and notches are present as in FIG. 6. Short circuits to ground are present at locations 708, 710, 712, 714, 716, 718, 740 and 742. RF Switches which are in a pass through state are present at locations marked by unlabeled small unfilled rectangles in FIG. 7. In this way, FIG. 7 shows four matrix antennas one in each corner of the back part. An individual matrix antenna in this example comprises five radiating elements located around a corner of the back part. Three of the elements are parallel to a side of the back part and two are curved elements concentric with one another and concave with respect to the corner. Each individual matrix antenna has a single feed point 700, 702, 704, 706 which receives input from input 306. As a result of input at feed point 700 current flows along radiating elements 2, 18, 19, 16 and one additional element next to element 16 to create a resonating antenna.

In the example of FIG. 7 and FIG. 3 the matrix antennas are directly fed. However, it is also possible to use parasitic antenna arrangements.

Antenna efficiency of the antenna arrangement of FIG. 7 has been empirically measured for frequencies ranging from 500 MHz to 3 GHz. It was found that the efficiency, measured in decibels, ranged from close to zero for frequencies of around 500 MHz to around −6 dB for 700 to 960 MHz and then increased to just below zero before dropping, at around 1.7 GHz to below −6 dB and then rising again to above −3 dB and below zero. These results demonstrate good working ability of the arrangement of FIG. 7 for practical mobile communications device purposes.

Figure 8:
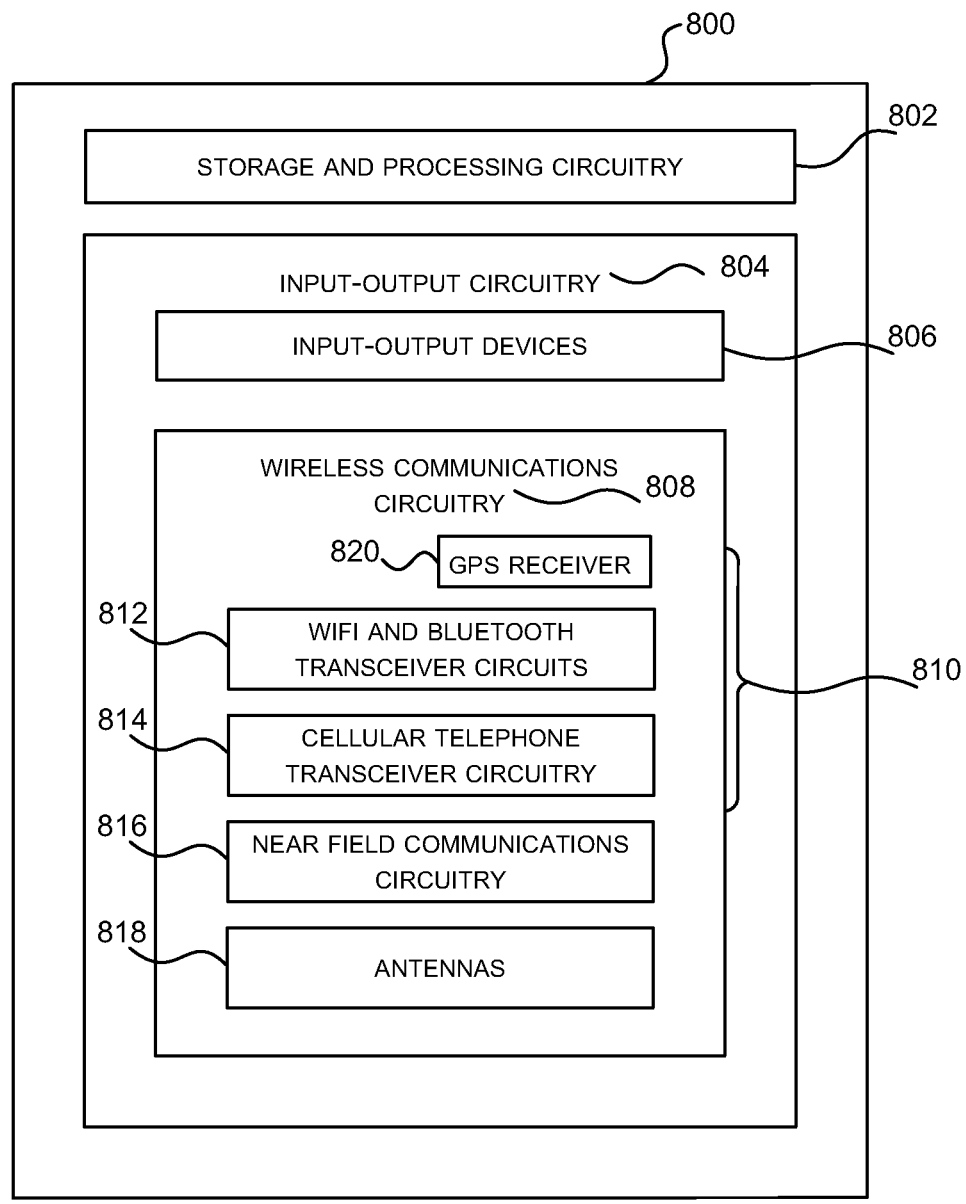
FIG. 8 illustrates an exemplary mobile communications device comprising one or more antennas.

FIG. 8 is a schematic diagram of a communications device 800 comprising one or more antennas including one or more matrix antennas as described herein. The communications device 800 is an example of a communications device implementing the mobile communications device 100 of FIG. 1 such as in the form of a smart phone, or other mobile telecommunications device.

The communications device 800 comprises control circuitry including storage and processing circuitry 802. Storage and processing circuitry 802 includes storage such as hard disk drive storage, nonvolatile memory (e.g. flash memory or other electrically-programmable read-only memory configured to form a solid state drive), volatile memory (such as static or dynamic random access memory). The storage and processing circuitry 802 comprises processing circuitry to control operation of the communications device 800. The processing circuitry comprises one or more microprocessors, microcontrollers, digital signal processors, baseband processors, power management units, audio codec chips, application specific integrated circuits and other components. The storage and processing circuitry 802 is able to run software on the computing device 800 such as internet browsing applications, voice over internet protocol applications, email applications, media playback applications, operating system functions and others. The storage and processing circuitry 802 may implement one or more communications protocols including NFC communication protocols, internet protocols, WLAN protocols, Bluetooth (trade mark) protocol, cellular telephone protocols and others.

The storage and processing circuitry 802 is configured to implement one or more control processes to control the use of one or more antennas in the communications device 800 such as a matrix antenna and/or other types of antenna. The storage and processing circuitry 802 may be configured to perform signal quality monitoring and sensor monitoring and to use the monitored data to adjust one or more switches, tunable elements or other adjustable circuits in the device to adjust antenna performance. For example, to control configuration of RF switches of a matrix antenna, to control which of two or more antennas is used to receive wireless communications, which antenna is used to transmit wireless communications, to control how incoming data is routed, to tune one or more of the antennas to different frequency bands, to perform multiplexing operations or demultiplexing operations, to share antenna structures between near field and non near field circuitry and others.

The communications device 800 comprises input-output circuitry 804 for enabling data to be input to the device 800 and to enable data to be output from the device 800. The communications device 800 comprises one or more input-output devices 806 such as a touch screen, button, microphone, speaker, tone generator, vibrator, camera, sensor, light emitting diode, status indicator, data port, joystick, click wheel, scroll wheel, touch pad, key pad, keyboard or others. A user is able to control operation of the device 800 by making input at one or more of the input-output devices. The input-output circuitry 804 and input output devices 806 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The communications device 800 has wireless communications circuitry 808 comprising radio frequency (RF) transceiver circuitry formed from one or more integrated circuits, power amplifier circuitry, low-noise amplifiers, passive RF components, one or more antennas 818 and other circuitry for handling RF wireless signals. Wireless signals can also be sent using infra-red or other electromagnetic signals.

The wireless communications circuitry 808 comprises optional global positioning system (GPS) receiver circuitry 820, optional WiFi (trade mark) and Bluetooth (trade mark) transceiver circuits 812, and cellular telephone transceiver circuitry 814. Near field communications circuitry 816 is optionally included.

One or more antennas 818 are included and comprise at least one matrix antenna as described herein. In addition to the at least one matrix antenna, other antennas may be included such as antennas with resonating elements that are formed from a loop antenna structure, patch antenna structure, inverted F antenna structures, close and open slot antenna structures, planar inverted F antenna structures, helical antenna structures, strip antennas, monopoles, dipoles, and others. Different types of antennas may be used for different bands or combinations of bands.

In an example there is a mobile communications device antenna assembly comprising:

at least one matrix antenna comprising a plurality of conductor elements connected by a plurality of radio frequency switches;

an antenna performance assessment component configured to determine performance of the matrix antenna;

control circuitry configured to change a state of one or more of the radio frequency switches on the basis of the determined performance of the matrix antenna.

For example, the antenna assembly is integral with a metal part of a case of a mobile communications device.

For example, the antenna performance assessment component is arranged to receive control messages from another entity over a wireless communications network, the control messages comprising information about communications performance between the other entity and the mobile communications device over the wireless communications network.

For example the antenna performance assessment component is arranged to measure reflected power of the matrix antenna.

For example the antenna performance assessment component comprises an antenna tuner.

For example the control circuitry is arranged to tune a matching circuit of the antenna in addition to changing the state of one or more of the radio frequency switches.

For example the radio switches comprise three state radio frequency switches wherein the three states comprise an open state, a pass through state and a ground state.

For example the radio switches comprise at least one radio frequency switch having only two states comprising an open state and a pass through state.

In an example there are a plurality of matrix antennas, each matrix antenna located in a corner of a back part of a case of a mobile communications device.

For example, the plurality of conductor elements are formed from a plurality of slots in a metal part of a case of a mobile communications device.

For example, the at least one matrix antenna comprises a plurality of conducting elements positioned around a corner of a back part of a case of a mobile communications device, at least one of the conducting elements being parallel to a side of the case and at least one of the conducting elements being curved so as to be concave with respect to the corner.

The antenna assembly may comprise a plurality of curved conducting elements which are generally concentric and concave with respect to the corner.

The antenna assembly may be sized and shaped to be integrated in a back part of a case of a hand held mobile communications device.

In examples there is a mobile communications device comprising an antenna assembly comprising:
  at least one matrix antenna comprising a plurality of conductor elements connected by a plurality of radio frequency switches;
  an antenna performance assessment component configured to determine performance of the matrix antenna;
  control circuitry configured to change a state of one or more of the radio frequency switches on the basis of the determined performance of the matrix antenna.

In examples there is a method of operation of an antenna assembly comprising:
  determining performance of at least one matrix antenna in a mobile communications device, the matrix antenna having a plurality of conductor elements connected by a plurality of radio frequency switches;
  operating control circuitry at the antenna assembly to change a state of one or more of the radio frequency switches on the basis of the determined performance of the matrix antenna.

For example the performance is determined by receiving control messages from another entity in wireless communication with the antenna assembly.

The method above may comprise determining the performance by measuring reflected power of the matrix antenna.

The method may comprise determining the performance by using an antenna tuner and also tuning a matching circuit of the matrix antenna using the antenna tuner.

The method may comprise changing a state of one or more of the radio frequency switches between three possible states being a pass through state, an open state and a ground state.

Methods may comprise changing a state of one or more of the radio frequency switches between only two possible states being a pass through state and an open state.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A mobile communications device antenna assembly comprising:
  one or more matrix antennas comprising a plurality of conductor elements connected by a plurality of radio frequency (RF) switches;
  an antenna performance assessment component coupled to the one or more matrix antennas, the antenna performance assessment component configured to determine performance of the one or more matrix antennas and to receive control messages from another entity over a wireless communications network, the control messages comprising information about communication performance between the other entity and the mobile communications device over the wireless communications network; and
  control circuitry coupled to the one or more matrix antennas, the control circuitry configured to change a state of one or more of the RF switches based at least in part on the determined performance of the matrix antenna and the communication performance.

2. The antenna assembly of claim 1, wherein the antenna assembly is integral with a metal part of a case of a mobile communications device.

3. The antenna assembly of claim 1, wherein the antenna performance assessment component is arranged to measure reflected power of the one or more matrix antennas.

4. The antenna assembly of claim 1, wherein the antenna performance assessment component comprises an antenna tuner.

5. The antenna assembly of claim 4, wherein the control circuitry is arranged to tune a matching circuit of the one or more antennas in addition to changing the state of one or more of the RF switches.

6. The antenna assembly of claim 1, wherein the RF switches comprise three state RF switches wherein the three states comprise an open state, a pass through state and a ground state.

7. The antenna assembly of claim 1 wherein the RF switches comprise at least one RF switch having only two states comprising an open state and a pass through state.

8. The antenna assembly of claim 1, wherein each of the one or more matrix antennas is located in a corner of a back part of a case of a mobile communications device.

9. The antenna assembly of claim 1, wherein the plurality of conductor elements is formed from a plurality of slots in a metal part of a case of a mobile communications device.

10. The antenna assembly of claim 1, wherein the one or more matrix antennas comprise a plurality of conducting elements positioned around a corner of a back part of a case of a mobile communications device, at least one of the conducting elements being parallel to a side of the case and at least one other of the conducting elements being curved so as to be concave with respect to the corner.

11. The antenna assembly of claim 10, wherein the one or more matrix antennas comprise a plurality of curved conducting elements which are generally concentric and concave with respect to the corner.

12. The antenna assembly of claim 1, wherein the antenna assembly is sized and shaped to be integrated in a back part of a case of a hand held mobile communications device.

13. A mobile communications device comprising:
an antenna assembly, the antenna assembly comprising:
a matrix antenna comprising a plurality of conductor elements connected by a plurality of radio frequency (RF) switches;
an antenna performance assessment component coupled to the matrix antenna, the antenna performance assessment component configured to determine performance of the matrix antenna and to receive control messages from another entity over a wireless communications network, the control messages comprising information about communication performance between the other entity and the mobile communications device over the wireless communications network; and
control circuitry coupled to the matrix antenna, the control circuitry configured to change a state of one or more of the RF switches based at least in part on the determined performance of the matrix antenna and the communication performance.

14. A method of operation of an antenna assembly comprising:
determining performance of a matrix antenna in a mobile communications device, the matrix antenna having a plurality of conductor elements connected by a plurality of radio frequency (RF) switches;
receiving control messages from another entity over a wireless communications network, the control messages comprising information about communication performance between the other entity and the mobile communications device over the wireless communications network; and
operating control circuitry at the antenna assembly to change a state of one or more of the RF switches based at least in part on the determined performance of the matrix antenna and the communication performance.

15. A method as claimed in claim 14, wherein determining the performance of the matrix antenna comprises measuring reflected power of the matrix antenna.

16. A method as claimed in claim 14, wherein determining the performance of the matrix antenna comprises by using an antenna tuner and also tuning a matching circuit of the matrix antenna using the antenna tuner.

17. A method as claimed in claim 14, wherein the state of the one or more of the RF switches includes three possible states: a pass through state, an open state, and a ground state.

18. A method as claimed in claim 14, wherein the state of the one or more of the RF switches includes two possible states: a pass through state and an open state.

19. A mobile communications device antenna assembly comprising:
one or more matrix antennas comprising a plurality of conductor elements connected by a plurality of radio frequency (RF) switches;
an antenna performance assessment component configured to determine performance of the one or more matrix antennas; and
control circuitry configured to change a state of one or more of the RF switches based at least in part on the determined performance of the matrix antenna,
wherein each of the one or more matrix antennas is located in a corner of a back part of a case of a mobile communications device.

20. A mobile communications device antenna assembly comprising:
one or more matrix antennas comprising a plurality of conductor elements connected by a plurality of radio frequency (RF) switches;
an antenna performance assessment component configured to determine performance of the one or more matrix antennas; and
control circuitry configured to change a state of one or more of the RF switches based at least in part on the determined performance of the matrix antenna,
wherein the one or more matrix antennas comprise a plurality of conducting elements positioned around a corner of a back part of a case of a mobile communications device, at least one of the conducting elements being parallel to a side of the case and at least one other of the conducting elements being curved so as to be concave with respect to the corner.

21. The antenna assembly of claim 20, wherein the one or more matrix antennas comprise a plurality of curved conducting elements which are generally concentric and concave with respect to the corner.

* * * * *